United States Patent
Belz et al.

(10) Patent No.: US 9,215,509 B2
(45) Date of Patent: Dec. 15, 2015

(54) MULTIMEDIA PROCESSING RESOURCE WITH INTERACTIVE VOICE RESPONSE

(75) Inventors: Steven M. Belz, Sunnyvale, TX (US); James Pratt, Round Rock, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 355 days.

(21) Appl. No.: 12/342,858

(22) Filed: Dec. 23, 2008

(65) Prior Publication Data

US 2010/0162331 A1    Jun. 24, 2010

(51) Int. Cl.
*H04N 7/173* (2011.01)
*H04N 21/6587* (2011.01)
*H04L 12/28* (2006.01)
*H04N 21/41* (2011.01)
*H04N 21/422* (2011.01)
*H04N 21/4363* (2011.01)
*H04N 21/485* (2011.01)

(52) U.S. Cl.
CPC ........ *H04N 21/6587* (2013.01); *H04L 12/2803* (2013.01); *H04N 21/4126* (2013.01); *H04N 21/42203* (2013.01); *H04N 21/42204* (2013.01); *H04N 21/43637* (2013.01); *H04N 21/485* (2013.01)

(58) Field of Classification Search
CPC ................... H04N 21/4126; H04N 21/42203; H04N 21/6587; H04N 21/43637; H04N 21/485; H04N 21/42204; H04L 12/2803
USPC .................... 709/232; 725/106, 109, 110, 131
See application file for complete search history.

(56) References Cited

U.S. PATENT DOCUMENTS

| | | | |
|---|---|---|---|
| 7,307,574 B2 | 12/2007 | Kortum et al. | |
| 7,602,898 B2 | 10/2009 | Klein et al. | |
| 7,606,529 B1 * | 10/2009 | Swan et al. | 455/3.06 |
| 7,636,300 B2 * | 12/2009 | Scott, III | H04L 12/2803 370/217 |
| 7,716,714 B2 | 5/2010 | Kortum et al. | |
| 7,793,317 B2 | 9/2010 | Sullivan et al. | |
| 2004/0073927 A1 * | 4/2004 | Knudson et al. | 725/58 |
| 2004/0181809 A1 * | 9/2004 | Schilling | 725/98 |
| 2006/0026663 A1 | 2/2006 | Kortum et al. | |
| 2006/0037043 A1 | 2/2006 | Kortum et al. | |
| 2006/0037083 A1 | 2/2006 | Kortum et al. | |
| 2006/0039547 A1 | 2/2006 | Klein et al. | |

(Continued)

FOREIGN PATENT DOCUMENTS

WO    WO-2007141241 A1 *   12/2007    ........... H04L 29/06

OTHER PUBLICATIONS

"characteristic—definition of characteristic by the Free Online Dictionary, Thesaurus and Encyclopedia"(quoting The American Heritage® Dictionary of the English Language, 4th ed., 2009, Houghton Mifflin Co.), accessed Oct. 5, 2011 at <http://www.thefreedictionary.com/characteristic>.*

*Primary Examiner* — Joon H Hwang
*Assistant Examiner* — Abdulkader M Alriyashi
(74) *Attorney, Agent, or Firm* — Jackson Walker L.L.P.

(57) ABSTRACT

A multimedia processing resource (MPR) includes interactive voice response capabilities. A user may control MPR commands and functions over a telephone interface. For example, through a telephone connection a user may receive a listing of electronic programming guide data, may schedule a multimedia program for recording, or may receive a report related to a multimedia program that is viewed at the present time.

17 Claims, 7 Drawing Sheets

(56) References Cited

U.S. PATENT DOCUMENTS

| | | | |
|---|---|---|---|
| 2006/0041923 A1* | 2/2006 | McQuaide, Jr. | 725/131 |
| 2006/0048178 A1 | 3/2006 | Kortum et al. | |
| 2006/0075429 A1* | 4/2006 | Istvan et al. | 725/39 |
| 2006/0114360 A1 | 6/2006 | Kortum et al. | |
| 2006/0117374 A1 | 6/2006 | Kortum et al. | |
| 2006/0156372 A1 | 7/2006 | Cansler, Jr. | |
| 2006/0170582 A1 | 8/2006 | Kortum et al. | |
| 2006/0274766 A1* | 12/2006 | Kwon | 370/401 |
| 2007/0011250 A1 | 1/2007 | Kortum et al. | |
| 2007/0044119 A1 | 2/2007 | Sullivan et al. | |
| 2007/0106941 A1* | 5/2007 | Chen et al. | 715/728 |
| 2007/0118857 A1* | 5/2007 | Chen et al. | 725/61 |
| 2007/0124772 A1* | 5/2007 | Bennett et al. | 725/61 |
| 2007/0130588 A1 | 6/2007 | Edwards et al. | |
| 2007/0143790 A1 | 6/2007 | Williams et al. | |
| 2007/0177188 A1 | 8/2007 | Wollmershauser et al. | |
| 2007/0180382 A1 | 8/2007 | Kortum et al. | |
| 2007/0214474 A1* | 9/2007 | McClenny et al. | 725/31 |
| 2007/0242659 A1* | 10/2007 | Cantu et al. | 370/352 |
| 2008/0104630 A1 | 5/2008 | Bruce et al. | |
| 2008/0117902 A1* | 5/2008 | Vinneras | 370/389 |
| 2008/0125098 A1 | 5/2008 | Bruce et al. | |
| 2008/0165283 A1 | 7/2008 | Brandt et al. | |
| 2008/0261514 A1 | 10/2008 | Pratt et al. | |
| 2009/0067415 A1* | 3/2009 | Liu et al. | 370/354 |
| 2009/0094654 A1 | 4/2009 | Sullivan et al. | |
| 2009/0125971 A1 | 5/2009 | Belz et al. | |
| 2009/0158369 A1 | 6/2009 | Van Vleck et al. | |
| 2009/0158373 A1 | 6/2009 | Belz et al. | |
| 2010/0122306 A1 | 5/2010 | Pratt et al. | |
| 2010/0158533 A1 | 6/2010 | Belz et al. | |

* cited by examiner

MULTIMEDIA PROCESSING RESOURCE WITH INTERACTIVE VOICE RESPONSE

BACKGROUND

1. Field of the Disclosure

The present disclosure generally relates to multimedia content distribution networks, and more particularly to remotely accessing and controlling a multimedia processing resource.

2. Description of the Related Art

Multimedia content may be received over a multimedia content distribution network (MCDN) and processed by a multimedia processing resource (MPR) such as a set-top box (STB) for presentation on a display. Access and control of MPR features are traditionally performed locally with a graphical user interface and/or remote control device inputs.

DESCRIPTION OF EXEMPLARY EMBODIMENTS

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an MPR, television, or other form of receiver is required to select a channel from the mixed signal for playing or recording. A user wishing to play or record multiple channels typically needs to have distinct tuners for each desired channel. This can be an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with customer premises equipment (CPE) including, for example, a digital subscriber line (DSL) modem in communication with an MPR, a display, a program presentation device, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view (PPV), electronic programming guides (EPGs), and the like. Bidirectional networks may also enable a service provider to collect information related to a user's preferences, whether for purposes of providing preference based features to the user, providing potentially valuable information to service providers, or providing potentially lucrative information to content providers and others.

Some disclosed embodiments implement an interactive voice response system within an MPR. For example, an STB for receiving multimedia content from an MCDN may include an interactive voice response module that receives and processes voice commands received over a telephone line. The STB may be accessed directly using a dedicated phone number or through an extension of a base telephone number. In an exemplary scenario, a user calls his or her residence where the STB is located, and after a residential gateway or other device answers the call, the user enters a suffix to be connected to the interactive voice response enabled STB. The interactive voice response enabled STB may provide the user with access to controls including reviewing scheduled recordings, setting up a new recording, searching for shows, accessing EPG information, learning what is currently being watched, locking or unlocking an STB, adjusting volume settings, changing the channel, and accessing or using interactive applications.

In one aspect, a disclosed MPR includes a network interface for receiving multimedia content from an MCDN and a decoder for providing data based on the received content to a multimedia presentation device (e.g., a television and/or stereo). The network interface may include wired or wireless capability and communicate using IP protocols. The MPR further includes a telephone interface and a storage medium (e.g., a magnetic disk drive or solid state memory) with instructions for implementing a call processing module for receiving a telephone call. In some embodiments, the MPR includes a user settings module for storing voice-recognition data for an identified caller. In addition, the call processing module may perform caller identification (CID) functions to identify callers and access the stored voice-recognition data. The call processing module may also enable participation in IP based communications sessions, including session initiation protocol (SIP) sessions. Further instructions implement an interactive voice response module for recognizing a command received from a telephone call and a command conversion module for translating the recognized command to an MPR command. In some embodiments, the interactive voice response module includes instructions for recognizing telephone-based tone commands such as dual-tone multimedia frequency (DTMF) commands. The interactive voice response module may further include instructions for storing a received voice print, determining whether the received voice print matches a stored voice print, and storing the received voice print as a recognized command in response to determining a match.

In another aspect, a disclosed process for controlling an MPR includes answering a call request, routing a call request to an MPR using an identifier associated with the MPR to establish a call, and receiving an MPR control request via the call using one or more of voice recognition and DTMF signaling. The identifier associated with the MPR may be an IP address or a telephone number extension, as examples. The disclosed process may include prompting a caller to request at least one of reviewing a scheduled recording and setting up a new recording. A caller may be prompted to request at least one of accessing electronic programming guide information and searching for multimedia programs. Alternatively, the caller may be prompted to request identifying a multimedia program currently viewed. The caller may also be prompted to request changing a lock status of the MPR. For example, the MPR may be locked during the call to prevent access or viewing.

In still another aspect, a disclosed service controls an MPR and includes receiving an auditory command over a telephone communication path, determining whether the auditory command is a voice command or dual-tone multi-frequency signaling command, interpreting the auditory command, and executing an MPR command based on the interpreted command. The telephone communication path may include a voice over Internet protocol (VoIP) network and/or a public switched telephone (PSTN) network.

In other embodiments, a disclosed MPR is enabled to distribute its presentation settings to other MPRs. In one aspect, a disclosed MPR includes a processor, a control interface for receiving a presentation setting, a network interface for communicating with a secondary MPR, and a presentation settings module for communicating the presentation setting to the secondary MPR. Example presentation settings include contrast, brightness, tint, sharpness, color, aspect ratio, zoom level, and closed-captioned settings. The network interface may enable the MPR compatibility with home phoneline networking alliance (HPNA) networks, wireless Ethernet networks, and wired Ethernet networks, as examples. The MPR may further include a permission module for communicating security credentials to the secondary MPR and verifying rights to adjust presentation settings of the secondary MPR.

In another aspect, a disclosed process for distributing presentation settings includes receiving a presentation setting at a primary MPR, storing the presentation setting to a tangible computer readable medium, and transmitting the presentation setting from the primary MPR to a secondary MPR. Transmitting the presentation setting may be over a wired or wireless Ethernet compatible interface or an HPNA interface, as examples. In some embodiments, the process includes transmitting permission data from the primary MPR to the secondary MPR. An example of permission data includes security credentials for the secondary MPR verifying that the primary MPR has sufficient rights to affect presentations settings on the secondary MPR.

In still another aspect, a disclosed service for distributing presentation settings includes receiving user input indicative of a presentation setting for a primary MPR, storing the presentation setting, formatting a primary display based on the presentation setting, and transmitting the presentation setting to a secondary MPR responsive to further user input. In addition, the service includes formatting the secondary display based on the transmitted presentation setting. In some embodiments, the presentation setting is transmitted by a radio frequency communication link (e.g., WiFi™ or Bluetooth™).

Some disclosed embodiments relate to forwarding remote control commands to multiple CPE devices (e.g., MPRs or repeaters). In some embodiments, a repeater in a first viewing area receives an infrared signal with a remote control command from a first remote control device. The repeater retransmits a signal with the remote control command to a CPE device in a second viewing area. The CPE in the second viewing area may translate the received remote control command and provide an infrared signal with the translated remote control command to multimedia program presentation devices (e.g., a television and a stereo) in the second viewing area. In this way, the receiver in the first viewing area acts as a repeater for distributing remote control commands to the second viewing area and a user may control the program presentation devices in both viewing areas, with a signal remote control command. For example, the user may adjust the volume, channel selection, mute settings, and power ON functionality for program presentation devices in a plurality of viewing areas.

In one aspect, a disclosed remote control system includes a remote control device for transmitting a remote control command via a first infrared signal, a repeater for receiving the first infrared signal and retransmitting the remote control command, and a receiver for receiving the retransmitted remote control command and propagating a second infrared signal based on the retransmitted remote control command. In some embodiments, the retransmitted remote control command is received by a remote control device in a second viewing area. Retransmission may occur through radio frequency signals. The remote control command received by the repeater may be compatible for a first CPE device, and the receiver is enabled to translate the retransmitted remote control command for compatibility with a second CPE device. The remote control command may be, for example, a channel selection command, a volume control command, a power ON, or a power OFF command. The remote control commands may operate multimedia program presentation devices such as televisions, MPRs, STBs, and stereos. In some embodiments, the repeater is integrated with a CPE device such as an STB. The receiver that receives the retransmitted signal may be integrated with a remote control device.

In another aspect, a disclosed process relates to distributing remote control commands and includes receiving a remote control command transported by a first infrared signal in a first multimedia program presentation location from a first remote control device. The process further includes transmitting a forwarding signal based on the remote control command to a second multimedia program presentation location.

The forwarding signal is received in the second multimedia program presentation location and a second infrared signal based on the remote control command is transmitted in the second multimedia program presentation location. The forwarding signal may be a radio frequency signal. The process may further include translating the remote control command for compatibility with a CPE device in the second multimedia program presentation location. An STB may transmit the forwarding signal and a second remote control device may receive the forwarded signal. A disclosed repeater for retransmitting the initial infrared signal may be a CPE device communicatively coupled to a local area network through a wired or wireless connection.

In still another aspect, a disclosed MPR includes a remote control device interface for receiving a remote control command. The MPR further includes a tangible computer-readable medium embedded with processor-executable instructions including a command forwarding module for forwarding the remote control command. The MPR further includes a transmission interface for forwarding the remote control commands. The transmission interface may be a radio frequency interface, a wired local area network interface, or an HPNA interface. The MPR may further include a radio frequency receiver for receiving a forwarded remote control command from a transmitting MPR. Accordingly, disclosed embodiments relate to selective retransmission of remote control commands.

Below, exemplary embodiments are described in sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral may refer to a specific instance of an element and an un-hyphenated form of the reference numeral typically refers to the element generically or collectively. Thus, for example, element 121-1 refers to an instance of an MPR, which may be referred to collectively as MPRs 121 and any one of which may be referred to generically as an MPR 121.

Figure 1:
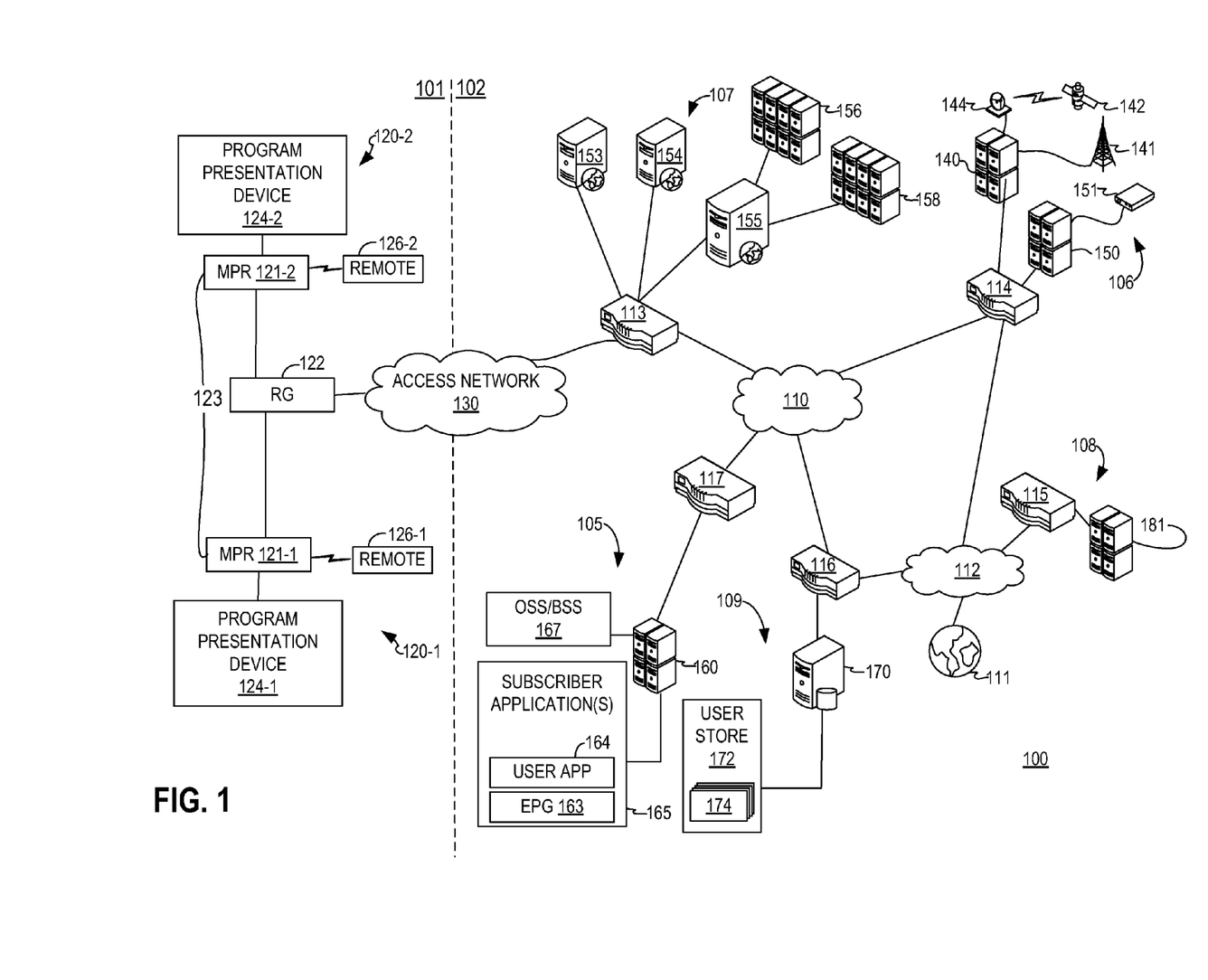
FIG. 1 illustrates a representative Internet protocol television (IPTV) architecture for receiving multimedia programs.

MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include both twisted pair copper cables and fiber optics cables. In a fiber to the curb (FTTC) access network, the "last mile" portion that employs copper is generally less than approximately 300 feet in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. Also in these embodiments, access network 130 may receive upstream traffic from a consumer's location using quadrature phase shift keying (QPSK) modulated RF signals.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements (e.g., emergency alert system messages) from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, an Internet or other type of Web network which is signified in FIG. 1 by the World Wide Web icon 111.

As shown in FIG. 1, client side 101 of MCDN 100 depicts two of a potentially large number of client side resources referred to herein simply as client(s) 120. Each client 120, as shown, includes an MPR 121, a residential gateway (RG) 122, a program presentation device 124, and a remote control device 126. In the depicted embodiment, MPR 121 communicates with server side devices through access network 130 via RG 122.

As shown in FIG. 1, RG 122 may include elements of a broadband modem (e.g., DSL modem or cable modem) and may communicate over wireless and/or wired interfaces. In addition, RG 122 may have elements of a firewall, router, switch, and access point for local area network (LAN) devices to communicate through wired and wireless (e.g., WiFi™) Ethernet or other suitable networking technologies. In some embodiments, MPR 121 is a uniquely addressable Ethernet compliant device. Program presentation device 124 may be, for example, any National Television System Committee (NTSC) and/or Phase Alternating Line (PAL) compliant program presentation device. Both MPR 121 and program presentation device 124 may include any form of conventional frequency tuner. As shown, remote control device 126 communicates wirelessly with MPR 121 using infrared (IR) or RF signaling. MPR 121-1 and MPR 121-2, as shown, may communicate through LAN 123. LAN 123 may be a wired or wireless network and may include any communication media or protocol including without limitation WiFi™, RF, and Home Phoneline Networking Alliance.

In IPTV compliant implementations of MCDN 100, clients 120 are configured to receive packet-based multimedia streams from access network 130 and process the streams for presentation on program presentation devices 124. In addition, clients 120 are network-aware resources that may facilitate bidirectional-networked communications with server side 102 resources to support network hosted services and features. Because clients 120 are configured to process multimedia content streams while simultaneously supporting more traditional Web like communications, clients 120 may support or comply with a variety of different types of network protocols including streaming protocols such as real-time transport protocol (RTP) over user datagram protocol/Internet protocol (UDP/IP), as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture down-linked signals transmitted by a satellite 142 and received by a parabolic dish 144. In addition, live acquisition server 140 may acquire programming feeds transmitted via a high-speed fiber feed or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. Live acquisition server 140 is communicatively coupled to an encoder which, prior to transmission, encodes acquired content using for example, Motion Picture Expert Group (MPEG) standards such as MPEG-2, MPEG-4, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., MPR 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to MPR 121 indicating a request for the particular channel. When MPR 121 responds to the remote control signal, MPR 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including RTP, real-time control protocol (RTCP), file transfer protocol (FTP), and real-time streaming protocol (RTSP).

In some embodiments, client-facing switch 113 routes multimedia content encapsulated into IP packets over access network 130. For example, an MPEG-2 transport stream may be sent in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, MPR 121 may access MCDN 100 using information received from client gateway 153. Subscriber devices may access client gateway 153, and client gateway 153 may then allow such devices to access private network 110 once the devices are authenticated or verified. Similarly, client gateway 153 may prevent unauthorized devices, such as hacker computers or stolen MPRs, from accessing the private network 110. Accordingly, in some embodiments, when an MPR 121 accesses MCDN 100, client gateway 153 verifies subscriber information by communicating with user store 172 via the private network 110. Client gateway 153 may verify billing information and subscriber status by communicating with an OSS/BSS gateway 167, which may translate a query to the OSS/BSS server 181. Upon client gateway 153 confirming subscriber and/or billing information, client gateway 153 may allow MPR 121 access to IPTV content, VOD content, and other services. If client gateway 153 cannot verify subscriber information (i.e., user information) for MPR 121, for example, because it is connected to an unauthorized local loop or RG, client gateway 153 may block transmissions to and from MPR 121 beyond access network 130.

MCDN 100, as depicted, includes application resources 105, which communicate with private network 110 via application switch 117. Application resources 105, as shown, include application server 160 which is operable to host or otherwise facilitate one or more subscriber applications 165 that are made available to system subscribers. For example, subscriber applications 165, as shown, include EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. User application 164, as illustrated in FIG. 1, emphasizes the ability to extend the network's capabilities by implementing a network-hosted application. Because application 164 may reside on the network, it generally does not impose any significant requirements or imply any substantial modifications to client 120 including MPR 121. In some instances, an MPR 121 may require knowledge of a network address associated with user application 164, but MPR 121 and the other components of client 120 are largely unaffected.

As shown in FIG. 1, a database switch 116, as connected to applications switch 117, provides access to database resources 109. Database resources 109 include database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

Figure 2:
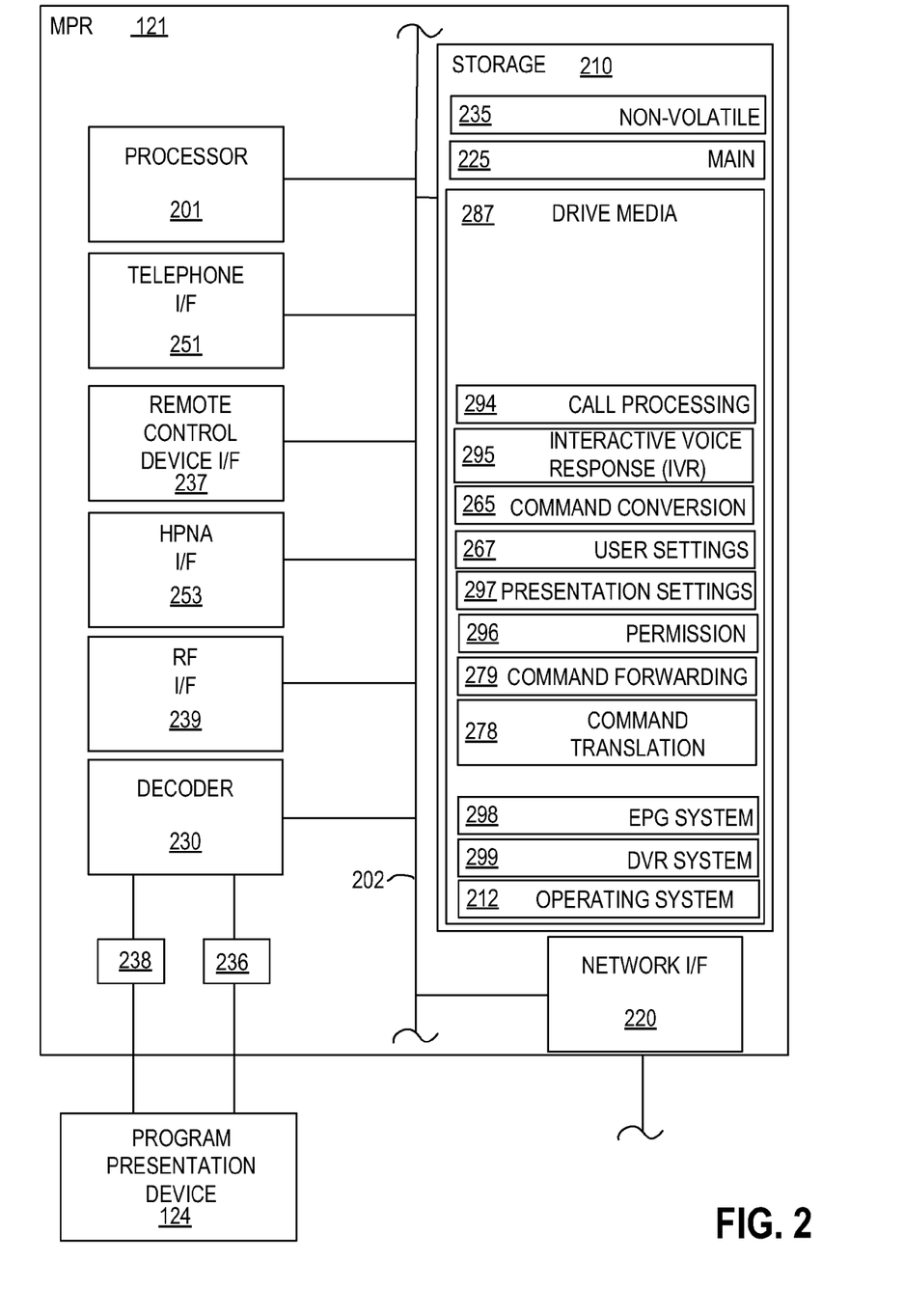
FIG. 2 is a block diagram of selected elements of a multimedia processing resource (MPR), which may be similar to or identical to MPR 121 in FIG. 1.

Referring to FIG. 2, a block diagram illustrating selected elements of MPR 121 is presented. In the depicted embodiment, MPR 121 includes a processor 201 communicatively coupled by bus 202 to storage 210, which includes non-volatile memory 235 and main memory 225. Storage 210 is operable to store instructions, data, or both and may include fixed media, removable media, magnetic media, and semi-conductor media, as examples. Storage 210 as shown includes multiple sets or sequences of instructions stored on drive media 287 including, operating system 212, DVR system 299, EPG system 298, command translation module 278, command forwarding module 279, permission module 296, presentation settings module 297, user settings 267, command conversion module 265, interactive voice response module 295, and call processing module 294. Operating system 212 may be a Unix® or Unix-like operating system, a Windows® family operating system, or another suitable operating system.

MPR 121 as depicted in FIG. 2 further includes a network adapter/interface 220 that interfaces MPR 121 to access network 130 (FIG. 1), possibly through a residential gateway (e.g., RG 122 in FIG. 1). MPR 121 may receive multimedia content such as television content from access network 130 (FIG. 1). In embodiments suitable for use in IP based content delivery networks, MPR 121, as depicted in FIG. 2, may include an audio/video (A/V) decoder 230 that assembles payloads from a sequence or set of network packets into a stream of multimedia content. The stream of multimedia content may include audio information and video information and A/V decoder 230 may parse or segregate the two to generate a video stream 238 and an audio stream 236 as shown.

Video and audio streams 238 and 236 may include audio or video information that has been compressed, encrypted, or both. A/V decoder 230 may employ any video decoding algorithm including for example without limitation any of the MPEG standards or WMV standards. Similarly, decoder 230 may employ any audio decoding algorithm including for example without limitation: Dolby® Digital, Digital Theatre System (DTS) Coherent Acoustics, and Windows Media Audio (WMA). The video and audio streams 238 and 236 are provided in a format suitable for program presentation device 124, which itself may not be a part of MPR 121. Program presentation device 124 may comply with NTSC, PAL or any other suitable television standard. As shown in FIG. 2, MPR includes network adapter/interface 220 for receiving multimedia content (e.g., movies) from an MCDN (e.g., MCDN 100 in FIG. 1). Decoder 230 produces data based on the received multimedia content for transport to program presentation device 124. Program presentation device 124 may be for example without limitation a television, a display integrated with MPR 121, and a data processing system (e.g., PC) with a monitor. In accordance with disclosed embodiments, MPR 121 further includes telephone interface 251 for receiving telephone calls from users. Telephone interface 251 may also be enabled to receive voice input locally from a user, such as through a microphone (not depicted) or other voice input device local to MPR 121. In some embodiments, MPR 121 is associated with its own dedicated phone line and corresponding dedicated telephone number. In addition, telephone interface 251 may include wireless capabilities for communication with cellular telephone networks. MPR 221 may also be associated with an extension, so that when a user dials into a residence or business, the user may enter a telephone extension address to be routed to MPR 121. For example, a user may call his or her residence, and in response to a residential gateway answering the telephone call, the user may enter, using a telephone keypad or using voice commands, an extension address such as "1234".

As shown, MPR 121 includes call processing module 294 which performs functions for receiving telephone calls, interactive voice response module 295 which performs functions for recognizing a command received from the telephone call, and command conversion module 265 which performs functions for translating recognized commands to MPR commands (e.g., provide EPG data, provide currently viewed program, etc.).

In some embodiments, interactive voice response module 295 includes instructions for recognizing telephone based tone commands such as DTMF commands. Interactive voice response module 295 may further include instructions for storing a received voice print, determining whether the received voice print matches a stored voice print, and executing recognized commands for the received voice print if there is a match. User settings 267 may store voice prints and voice recognition data used by interactive voice response module 295 in recognizing voice commands from callers.

Network adapter/interface 220 may be an IP network interface (e.g., an Ethernet interface) that allows communication over wireless (e.g., WiFi™, or Bluetooth™) and/or wired transmission paths. Call processing module 294 may include instructions for participating in an Internet protocol-based communication session and establishing an SIP session. In some embodiments, call processing module 294 does not receive a telephone call, but instead functions as a voice session module for receiving voice input from a user. Further, call processing module 294 may include CID instructions for identifying a caller. For example, a user may be associated with a telephone number for an incoming call. When a call is received from the telephone number associated with the user, call processing module 294 may automatically retrieve voice data from user settings 267 for the user. Interactive voice response module 295 and/or call processing module 294 further may perform voice analysis to verify the identity of the user. In response to determining the identity of a caller with CID information and possibly verifying the identity with voice recognition information, disclosed embodiments may retrieve voice recognition data from user settings 267 to accurately recognize voice commands from the caller.

Command conversion module 265 converts recognized commands into MPR commands. Example MPR commands include scheduling a recording, reviewing a scheduled recording, identifying a currently viewed multimedia program, changing a lock status of the MPR, changing a channel, and adjusting (e.g., raising, lowering, or muting) an audio volume of a multimedia program presentation. In some embodiments, interactive voice response module 295 provides speech output representative of EPG data. The EPG data may be searchable from spoken user input provided by the user. For example, a user may speak commands to specify a search of EPG data for all action movies scheduled to begin broadcast in the next two hours. In response, interactive voice response module 295 recognizes that the user has requested a search of the EPG. Command conversion module 265 accesses EPG data from EPG system 298 and formats the data for interactive voice response module 295 to provide through synthesized or pre-recorded speech. Accordingly, interactive voice response module 295 provides speech output representative of EPG data.

An embodied process relates to controlling MPR 121 through interactive voice commands. The process includes receiving and answering a call request. The call request may be received by a central call server, for example, located at a residence. The process includes routing the call request using an identifier associated with MPR 121. For example, MPR 121 may be associated with a telephone number extension or IP address. The process further includes receiving an MPR control request using either voice recognition, dual-tone multi-frequency signaling, or both. For example, an MPR control request to list EPG data may be received during the call. A caller may be prompted to request to review a list of scheduled recordings, access an EPG, search for multimedia programs, identify a multimedia program currently viewed, change a lock status of the MPR, adjust an audio volume of a multimedia program presentation, or change a channel. The caller may be prompted using synthesized speech provided by interactive voice response module 295 over telephone interface 251.

As shown in FIG. 2 MPR 121 may have functionality for distributing its settings to a secondary MPR or for receiving presentation settings from a primary MPR. Example presentation settings include contrast, brightness, tint, sharpness, color, aspect ratio, zoom level, and closed-caption settings. As shown, MPR 121 includes presentation settings module 297 for communicating, responsive to user input, the presentation settings of MPR 121 to a remote MPR over one or more interfaces including network adapter/interface 220, HPNA interface 253, or RF interface 239. Permission module 296 includes instructions for communicating security credentials to the secondary MPR. Permission module 296 may request security credentials from a user of MPR 121 in response to the user requesting to transmit the presentation settings to the remote (i.e., secondary) MPR. As shown, MPR 121 may either transmit its presentation settings to another MPR or receive presentation settings from another MPR. If MPR 121 is transmitting its presentation settings, it is referred to herein as the primary MPR. If MPR 121 receives presentation settings from another MPR, it is referred to herein as the secondary MPR.

As shown in FIG. 2, MPR 121 is enabled as a primary MPR for transmitting its presentation settings to a secondary MPR. User specified presentation settings may be received by MPR 121 from remote control device interface 237. A graphical user interface may be presented on program presentation device 124 in response to a user entering a settings mode. Presentation settings for users may be stored in user settings 267. In some embodiments, a user navigates a graphical user interface using remote control commands (e.g., up arrow or down arrow) received by MPR 121 through remote control device interface 237. Presentation settings module 297 communicates the presentation settings to a secondary MPR over network adapter/interface 220.

Figure 3:
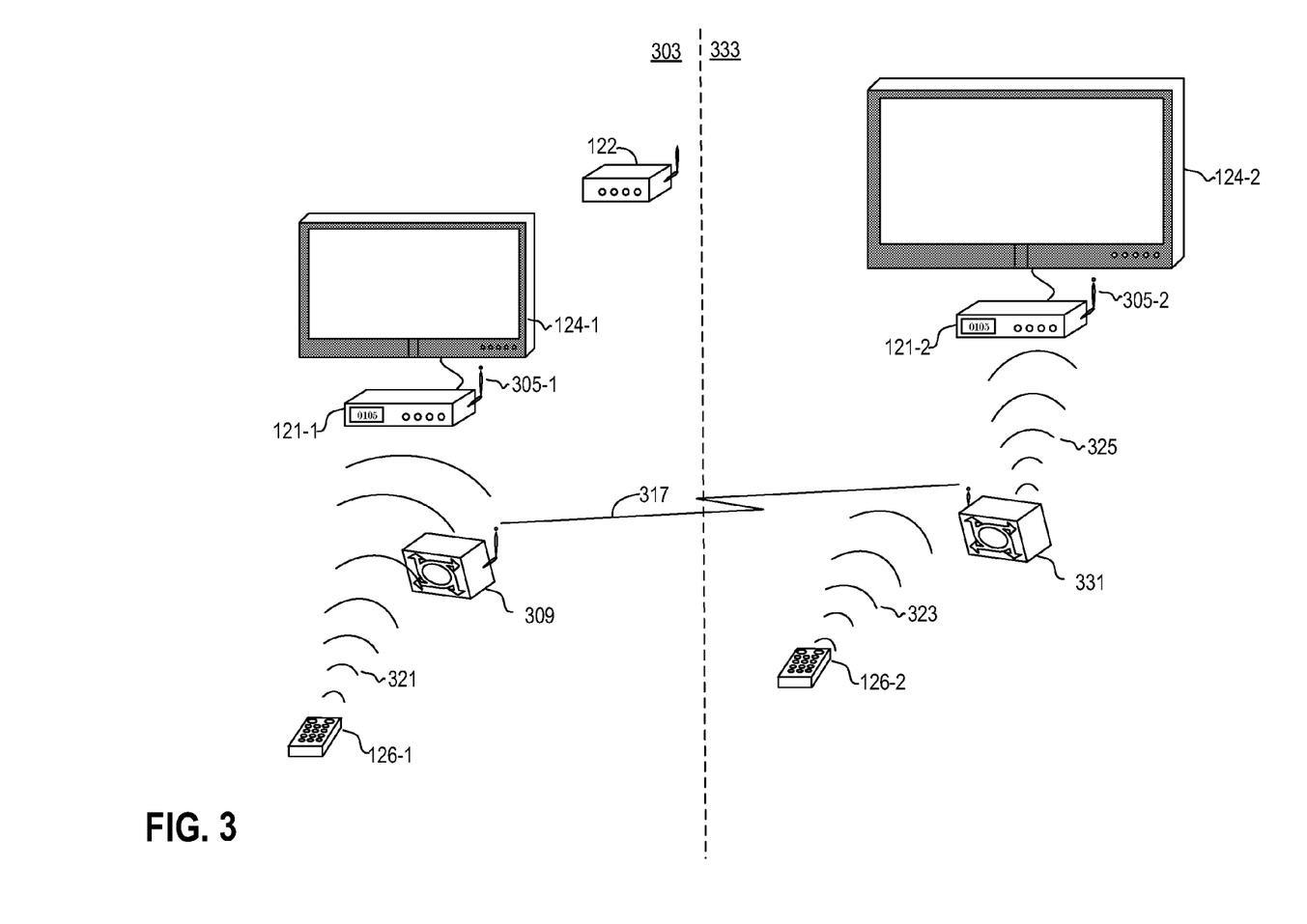
FIG. 3 illustrates selected aspects of an environment in which MPR 121 receives user input signals from remote control device 126.

As shown, FIG. 3 illustrates selected elements of an architecture for implementing a remote control device signal distribution system. As shown, remote control device 126-1 transmits a remote control command via infrared signal 321. Repeater 309 receives the infrared signal and retransmits the remote control command via RF signal 317 to receiver 331.

Receiver 331 receives the retransmitted remote control command and propagates infrared signal 325, which is based on the retransmitted remote control command, to MPR 121-2 and program presentation device 124-2. In some embodiments, repeater 309 receives the remote control command transmitted by infrared signal 321 and retransmits the remote control command to remote control device 126-2. In response to receiving the retransmitted remote control command, remote control device 126-2 propagates infrared signal 323 based on the retransmitted remote control command to MPR 121-2 and program presentation device 124-2. In some embodiments, receiver 331 or remote control device 126-2 translates received remote control commands for compatibility with program presentation device 124-2 and/or MPR 121-2.

In some embodiments, STB 121-1 acts as a repeater for receiving infrared signal 321 and retransmits a received remote control command using RF interface 305-1. In turn, the retransmitted remote control command may be received by STB 121-2 using RF interface 305-2.

As shown in FIG. 3, program presentation device 124-1 is in a first viewing area 303 and program presentation device 124-2 is in a second viewing area 333. Viewing areas 303 and 333 may be within the same residence or business, for example, but separated by walls that prevent infrared signal 321 from being received by MPR 121-2. As shown, RG 122 is located in viewing area 303 and, as shown in FIG. 1, may act to communicatively couple MPR 121-2 and MPR 121-1 to access network 130 (FIG. 1) for receiving multimedia content from MCDN 100.

Figure 4:
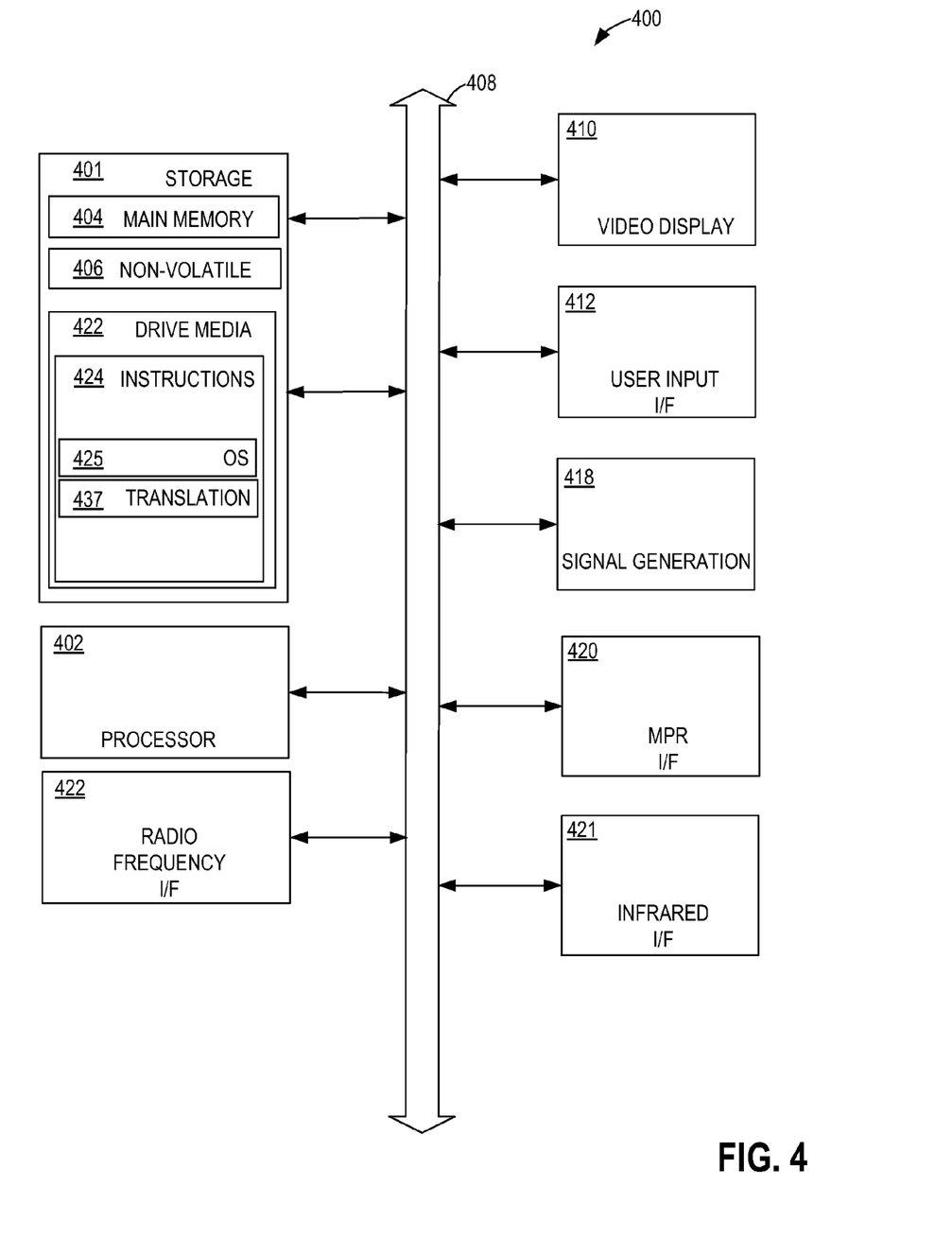
FIG. 4 is a block diagram of selected elements of a remote control device signal distribution apparatus.

As shown in FIG. 4, data processing system 400 may implement one or more of the functions, methods, or apparatuses disclosed herein. For example, data processing system 400 may be adapted as repeater 309 and/or receiver 331 in FIG. 3. As shown, data processing system 400 includes storage 401 with main memory 404, non-volatile memory 406, and drive media 422. Drive media 422, as shown, includes instructions 424 including operating system 425 and translation module instructions 437. If data processing system is acting as a repeater of remote control commands, infrared interface 421 receives infrared signals and radio frequency interface 422 retransmits the remote control commands based on the received infrared signals.

As shown, data processing system 400 includes video display 410. Video display 410, in conjunction with user input interface 412, may be used to configure data processing system 400 to translate received remote control commands for compatibility with certain multimedia program presentation devices. Signal generation 418 may be a speaker or other such device for providing output to signal operation or changes in configuration settings of data processing system 400. Translation module instructions 437 may store in drive media 422 translation tables for numerous CPE devices, and a user may provide an identifier for CPE devices that are in use to data processing system 400 in an interactive programming session using video display 410 and user input interface 412 (e.g., a keyboard). Data processing system 400 may also "learn" remote control codes by a user pointing a factory issued remote control device for a CPE device toward infrared interface 421 while remote control signals are sent from the remote control device. In addition to radio frequency interface 422 and infrared interface 421, data processing system 400 includes MPR interface 420, which may be a wired or wireless interface for communicating directly with an MPR. For example, MPR interface 420 may includes a wired connection for retransmission of received remote control commands.

Figure 5:
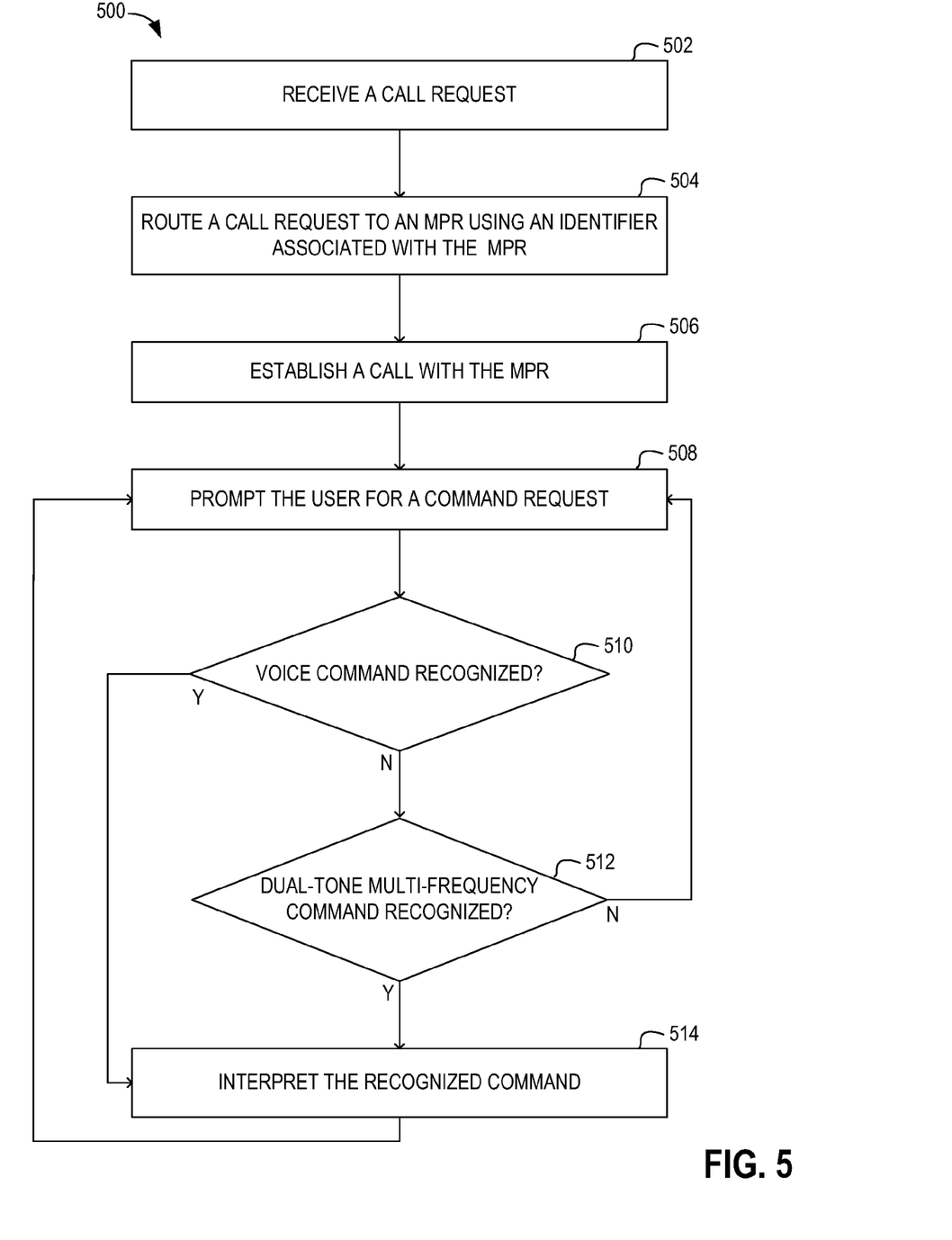
FIG. 5 illustrates selected operations in a method for controlling an MPR through interactive voice response commands.

FIG. 5 illustrates selected operations of method 500 for FIG. 3, repeater 309 transmits RF signal 317 to receiver 331. controlling an MPR using an interactive voice response system. As shown, method 500 includes receiving (block 502) a call request and routing (block 504) the call request to an MPR using an identifier associated with the MPR. For example, the identifier may be an IP address. The method further includes establishing (block 506) a call with the MPR and prompting (block 508) the user for a command request. For example, the method may include prompting a user to request EPG data by pressing 1, prompting the user to search for a multimedia program by pressing 2, and the like. If a voice command is recognized (block 510) the recognized command is interpreted (block 514) and translated to an MPR command. If a dual-tone multi-frequency command is recognized (block 512), the recognized command is interpreted, translated to an MPR command, and the method returns to prompt (block 508) the user for further command requests. If neither a voice command nor dual-tone multi-frequency command is recognized (block 512), the method returns to prompt (block 508) the user for further command requests.

Figure 6:
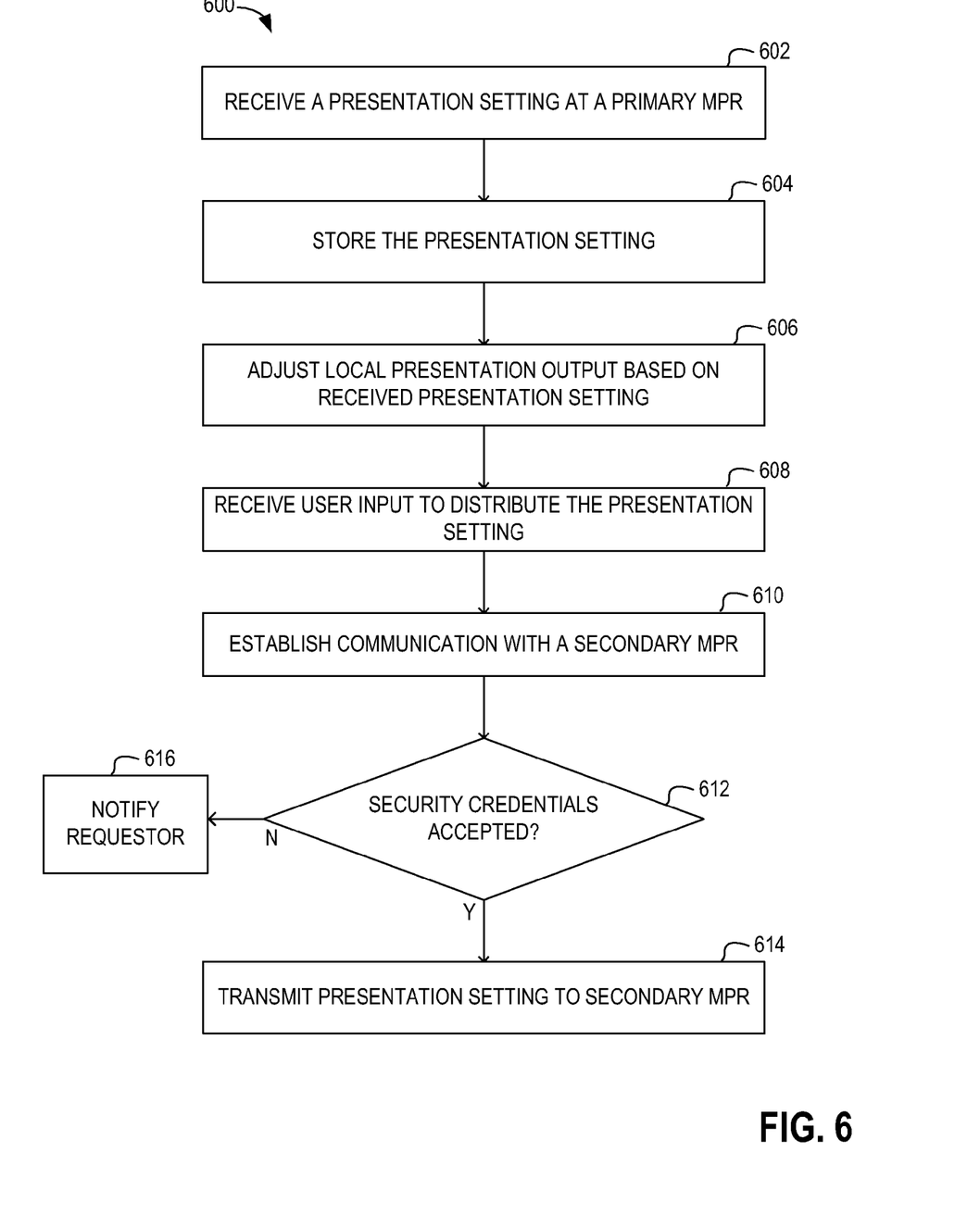
FIG. 6 illustrates selected operations in a method for distributing settings among multiple MPRs.

Referring now to FIG. 6, selected operations of method 600 for distributing presentation settings from a primary MPR to a secondary MPR are illustrated. As shown, method 600 includes receiving (block 602) a presentation setting at a primary MPR, storing (block 604) the presentation setting, and adjusting (block 606) local presentation output based on the received presentation setting. For example, as shown in FIG. 2, a user may request, through remote control device interface 237, to adjust the brightness shown on program presentation device 124. Accordingly, the user, through a graphical user interface for example, provides user input to increase the brightness. The brightness settings are stored in presentation settings module 297 and used to adjust the brightness of a program displayed on program presentation device 124. In turn, processor 201 and decoder 230 affect brightness settings provided with video stream 238. Alternatively, brightness settings received by MPR 121 may be transmitted to program presentation device 124 to effectuate a change in brightness. In some embodiments, MPR 121 and program presentation device 124 are integrated into a single CPE device and display settings for program presentation device 124 are controlled by presentation settings 297.

As shown in FIG. 6, method 600 includes receiving (block 608) user input to distribute the presentation settings of a primary MPR (e.g., MPR 121 in FIG. 2). For example, user input to distribute the presentation settings may be made by navigating a graphical user interface or pressing a "distribute settings" button on a remote control device. In response to the user input, method 600 includes establishing (block 610) communication with a secondary MPR. For example, a communication session with a secondary MPR may be established over a network interface (e.g., WiFi™ or Bluetooth™), HPNA interface, or a radio interface. In some embodiments, the secondary MPR may request security credentials from the primary MPR. If security credentials are accepted (block 612), presentation settings are transmitted (block 614) to the secondary MPR. If security credentials are not accepted (block 612), the requestor is notified (block 616).

Figure 7:
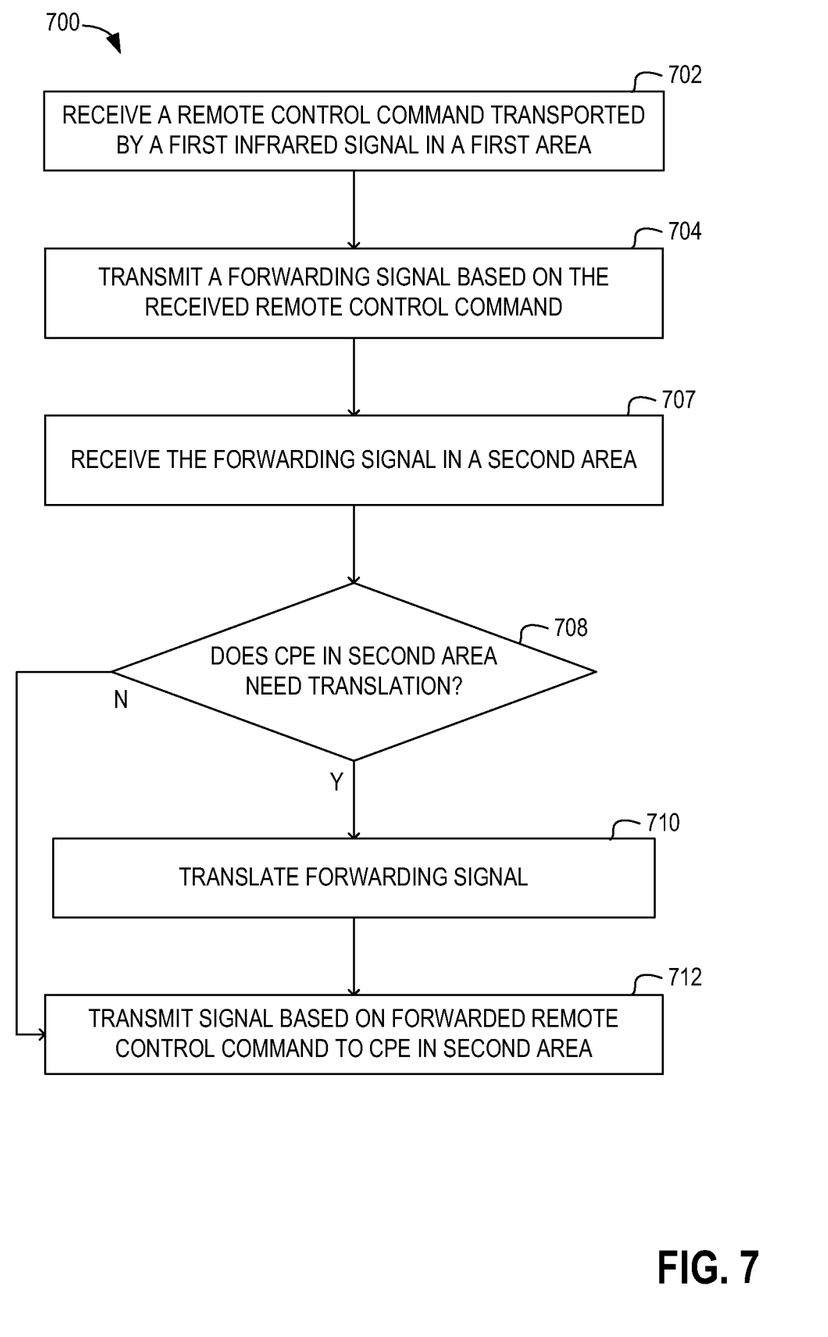
FIG. 7 illustrates selected operations in a method for distributing remote control signal device commands.

FIG. 7 illustrates selected operations in method 700 for distributing remote control commands. As shown, method 700 includes receiving (block 700) a remote control command transported by a first infrared signal in a first area. For example, as shown in FIG. 3, repeater 309 receives a remote control command transported by infrared signal 321 which is transmitted by remote control device 126-1. Method 700 further includes transmitting (block 704) a forwarding signal based on the received remote control command. As shown in RF signal 317 is a forwarding signal that is based on the remote control command issued by remote control device 126-1. Method 700 further includes receiving (block 707) the forwarding signal in a second area. As shown in FIG. 3, RF signal 317 is received in area 333. A determination is made (operation 708) whether CPE devices in the second area require translation of the forwarded remote control command. As shown in FIG. 3, receiver 331 may determine whether MPR 121-2 or program presentation device 124-2 need a translation of the received signal. If so, method 700 includes translating (block 710) the forwarding signal and transmitting (block 712) a signal based on the forwarded remote control command to the CPE devices in the second area. Translation may include converting remote control codes for compatibility with the CPE devices in the second area. If no translation is needed, the forwarded signal may be retransmitted as an infrared signal and sent to the CPE in the second area. As shown in FIG. 3, receiver 331 receives forwarding signal 317 and provides infrared signal 325 to MPR 121-2 and program presentation device 124-2.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A first multimedia processing resource, comprising:
    a network interface configured to connect to a residential gateway coupled to an access network of a multimedia service provider;
    a decoder module including a video decoder configured to generate a video stream, suitable for presentation on a display device, based on multimedia programming received by the network interface from the residential gateway;
    a telephone interface configured to:
        receive wirelessly a first telephone call to a dedicated phone number associated with the first multimedia processing resource; and
        receive a second telephone call, routed from the residential gateway based on a telephone number extension associated with the first multimedia processing resource, caller identification information indicative of a telephone number associated with a caller, and voice input provided during the second telephone call; and
    a processor having access to a computer readable medium including program instructions, executable by the processor, wherein the program instructions, when executed by the processor, cause the processor to perform operations comprising:
        retrieving voice recognition data specific to a caller setting associated with the caller identification information;
        processing the voice input based, in part, on the voice recognition data to recognize voice commands from the caller;
        recognizing, in the voice input, a presentation setting indicated by the caller;
        distributing the presentation setting to a secondary multimedia processing resource;
        implementing the presentation setting at the secondary multimedia processing resource;
        recognizing content criteria indicated by the voice input, wherein the content criteria indicate a content characteristic;
        accessing, within the first multimedia processing resource, electronic programming guide data listing multimedia programs containing content satisfying the content criteria;
        generating speech output reciting at least a portion of the electronic programming guide data, wherein the speech output is indicative of the multimedia programs satisfying the content criteria; and
        receiving at least one of the multimedia programs satisfying the content criteria.

2. The first multimedia processing resource of claim 1, wherein the telephone interface includes a microphone and is configured to receive local voice input from a user.

3. The first multimedia processing resource of claim 1, wherein the telephone interface is configured to recognize dual-tone multi-frequency commands.

4. The first multimedia processing resource of claim 1, wherein the content criteria indicate a genre.

5. The first multimedia processing resource of claim 1, wherein the operations include:
    determining whether a received voice print matches a stored voice print.

6. The first multimedia processing resource of claim 1, wherein the network interface is an IP network interface, the multimedia programming comprises a set of IP packets, and the first telephone call comprises a set of IP packets.

7. The first multimedia processing resource of claim 1, wherein the telephone interface is configured to support an IP-based communication session.

8. The first multimedia processing resource of claim 7, wherein the IP-based communication session includes a session initiation protocol session.

9. The first multimedia processing resource of claim 1, wherein the operations include:
    scheduling a recording of a portion of the multimedia programming;
    reviewing a scheduled recording;
    identifying a currently viewed multimedia program;
    changing a lock status of at least one of: the first multimedia processing resource and the secondary multimedia processing resource;
    changing a channel;
    adjusting a video quality of a multimedia program presentation; and
    adjusting an audio volume of a multimedia program presentation.

10. A method of providing multimedia content, the method comprising:
    responsive to receiving, by a telephone interface of a primary multimedia processing device, a routed telephone call routed from a residential gateway based on a telephone number extension associated with the primary multimedia processing device, performing particular operations; and
    responsive to receiving, by the telephone interface, a wireless telephone call to a dedicated telephone number associated with the primary multimedia processing device, performing the particular operations;
    wherein the particular operations include:
        recognizing caller identification information indicative of a telephone number associated with a caller, and accessing voice recognition data associated with the caller;

processing voice input provided by the caller based at least in part on the voice recognition data;

recognizing, in the voice input, a presentation setting indicated by the caller;

distributing the presentation setting to a secondary multimedia processing device;

implementing the presentation setting at the secondary multimedia processing device;

recognizing content criteria indicated during the telephone call;

accessing, within the primary multimedia processing device, electronic programming guide data listing multimedia programming satisfying the content criteria;

outputting speech output reciting at least a portion of the electronic programming guide data, wherein the speech output is indicative of multimedia programs satisfying the content criteria; and receiving, from the network interface, at least one of the multimedia programs satisfying the content criteria.

11. The method of claim 10, wherein the content criteria are indicated in the voice input.

12. The method of claim 10, wherein the content criteria are indicated, at least in part, by dual tone multi-frequency signals.

13. The method of claim 10, wherein the content criteria includes a genre criteria indicating a genre.

14. The method of claim 10, further comprising changing a lock status of the at least one of the primary multimedia processing device and the second multimedia processing device in response to recognizing a lock status request.

15. The method of claim 10, further comprising, responsive to recognizing a presentation setting request, adjusting a presentation setting selected from an audio volume setting, an image quality setting, and a current channel setting.

16. A non-transitory computer readable medium including program instructions, executable by a processor, wherein the program instructions, when executed by the processor, cause the processor to perform operations comprising:

responsive to receiving, by a telephone interface of a primary multimedia device, a routed telephone call routed to the network interface from a residential gateway based on a telephone number extension associated with the primary multimedia device, performing particular operations; and responsive to receiving, by the telephone interface, a wireless telephone call to a dedicated telephone number associated with the primary multimedia device, performing the particular operations;

wherein the particular operations include:

recognizing caller identification information indicative of a telephone number associated with a caller and accessing voice recognition data associated with the caller;

processing voice input provided by the caller based at least in part on the voice recognition data;

recognizing, in the voice input, a presentation setting indicated by the caller;

distributing the presentation setting to a secondary multimedia device;

implementing the presentation setting at the secondary multimedia device;

recognizing, in the voice input, content criteria;

accessing, within the primary multimedia device, electronic programming guide data indicating multimedia programs satisfying the content criteria;

providing speech output over the telephone call, the speech output reciting at least a portion of the electronic programming guide data corresponding to the multimedia programs satisfying the content criteria; and receiving at least one of the multimedia programs satisfying the content criteria.

17. The computer readable medium of claim 16, wherein the presentation setting is selected from a settings group of an audio volume setting, an image quality setting, and a current channel setting.

* * * * *